United States Patent [19]

Lynde et al.

[11] Patent Number: 5,373,900
[45] Date of Patent: * Dec. 20, 1994

[54] DOWNHOLE MILLING TOOL

[75] Inventors: Gerald D. Lynde, Houston, Tex.; Harold H. Harvey, Jr., Bossier City, La.

[73] Assignee: Baker Hughes Incorporated, Houston, Tex.

[*] Notice: The portion of the term of this patent subsequent to Mar. 29, 2011 has been disclaimed.

[21] Appl. No.: 96,010

[22] Filed: Jul. 22, 1993

Related U.S. Application Data

[63] Continuation-in-part of Ser. No. 948,362, Sep. 21, 1992, Pat. No. 5,297,630, which is a continuation of Ser. No. 680,702, Apr. 4, 1991, Pat. No. 5,150,755, which is a continuation-in-part of Ser. No. 621,063, Dec. 3, 1990, Pat. No. 5,058,666, which is a continuation of Ser. No. 181,812, Apr. 15, 1988, Pat. No. 4,978,260, which is a continuation-in-part of Ser. No. 816,287, Jan. 6, 1996, Pat. No. 4,796,709.

[51] Int. Cl.$^5$ .............................................. E21B 10/26
[52] U.S. Cl. ................................... 166/297; 166/55.6; 407/2; 407/116; 408/144
[58] Field of Search ............... 166/55.2, 55.6, 55.7, 166/55.8; 175/197, 325, 374, 375; 408/144, 145, 70, 80, 81, 82, 111, 43, 223, 227; 407/2, 6, 32, 66, 100, 116, 118, 119; 144/205; 82/40; 76/108.2, 108.4

[56] References Cited

U.S. PATENT DOCUMENTS

| | | | |
|---|---|---|---|
| 1,734,469 | 11/1929 | Journeay . | |
| 2,328,494 | 8/1943 | Reaney | 29/105 |
| 2,337,322 | 12/1943 | Gascoigne | 76/108 |
| 2,633,682 | 4/1953 | Jackson | 51/206 |
| 2,690,897 | 10/1954 | Clark | 255/76 |
| 2,709,490 | 5/1955 | Trimble et al. | 164/0.8 |
| 2,846,193 | 8/1958 | Chadderdon | 255/73 |
| 2,859,943 | 11/1958 | Chadderdon | 255/76 |
| 2,899,000 | 8/1959 | Medders et al. | 166/55.8 |
| 2,922,627 | 1/1960 | Kammerer | 255/76 |
| 2,940,522 | 6/1960 | Taylor et al. . | |
| 2,976,927 | 3/1961 | Kammerer et al. | 166/55.8 |
| 2,999,541 | 9/1961 | Kinzbach et al. | 166/55.7 |
| 3,059,708 | 10/1962 | Cannon et al. | 175/393 |
| 3,106,973 | 10/1963 | Christensen | 175/413 |
| 3,110,084 | 11/1963 | Kinzbach | 29/105 |

(List continued on next page.)

FOREIGN PATENT DOCUMENTS

| | | | |
|---|---|---|---|
| 488457 | 9/1976 | Australia | B23B 5/16 |
| 590374 | 7/1987 | Australia | E21B 29/00 |
| 0086582 | 8/1983 | European Pat. Off. | E21B 31/16 |
| 0156235 | 10/1985 | European Pat. Off. | E21B 10/46 |
| 0157278 | 10/1985 | European Pat. Off. | E21B 10/46 |
| 1340987 | 9/1962 | France . | |
| 0089545 | 9/1983 | Germany | B23C 5/10 |
| 947440 | 1/1964 | United Kingdom . | |
| 950305 | 2/1964 | United Kingdom . | |
| 2096669 | 10/1982 | United Kingdom . | |
| 530941 | 7/1975 | U.S.S.R. | E21B 9/16 |
| 791890 | 1/1977 | U.S.S.R. | E21B 10/02 |
| 869975 | 12/1979 | U.S.S.R. | B23B 5/16 |

OTHER PUBLICATIONS

Catalog, *Servco/Pilot Mill String Taper Mill*, 1984/85; p. 6706.

Manual 5999, *Tri-State Oil Tool Industries, Inc./Rotary Shoes*, Jun. 1982, 4 pages.

(List continued on next page.)

*Primary Examiner*—William P. Neuder
*Attorney, Agent, or Firm*—Nydegger & Associates

[57] ABSTRACT

A tool for cutting or milling casing in a well is disclosed. It includes a plurality of blades extending outwardly to a substantially radial position for cutting the walls of casing strings and removing a predetermined length of the casing strings in a cutting action. The blades have cutting elements positioned on leading faces of the blades to engage the casing strings in a cutting action without tripping or removal from the bore hole. The cutting element has surface irregularities to cause the metal chips cut from the casings to break off at short lengths. The cutting element can also have stress relieving grooves to prevent the propagation of a crack across the face of the element.

9 Claims, 4 Drawing Sheets

U.S. PATENT DOCUMENTS

| | | | |
|---|---|---|---|
| 3,114,416 | 12/1963 | Kammerer | 166/55.7 |
| 3,145,790 | 8/1964 | Bridwell et al. | 175/409 |
| 3,147,536 | 9/1964 | Lamphere | 29/106 |
| 3,195,636 | 7/1965 | Cordary et al. | 166/55.8 |
| 3,331,439 | 7/1967 | Sanford | 166/55.8 |
| 3,514,828 | 6/1970 | Wale | 29/105 |
| 3,726,351 | 4/1973 | Williams | 175/410 |
| 4,044,439 | 8/1977 | Romagnolo | 29/95 R |
| 4,191,255 | 3/1980 | Rives | 166/297 |
| 4,218,162 | 8/1980 | Hillier | 408/188 |
| 4,234,048 | 11/1980 | Rowley | 175/329 |
| 4,259,033 | 3/1981 | McCreery et al. | 407/114 |
| 4,274,769 | 6/1981 | Multakh | 408/145 |
| 4,440,247 | 4/1984 | Sartor | 175/393 |
| 4,452,325 | 6/1984 | Radd et al. | 175/410 |
| 4,499,795 | 2/1985 | Radtke | 76/108 |
| 4,500,234 | 2/1985 | Orth et al. | 408/206 |
| 4,550,781 | 11/1985 | Kagler | 166/340 |
| 4,591,303 | 5/1986 | Sato et al. | 408/206 |
| 4,626,140 | 12/1986 | Zweekly et al. | 407/114 |
| 4,682,663 | 7/1987 | Daly et al. | 175/329 |
| 4,696,502 | 9/1987 | Desai | 294/86.17 |
| 4,710,074 | 12/1987 | Springer | 408/200 |
| 4,717,290 | 1/1988 | Reynolds et al. | 407/34 |

OTHER PUBLICATIONS

Catalog, *Tri-State Oil Tool Industries, Inc./Superloy Pilot Mills, Superloy Tapered Mills*, 1984/85; p. 7213.

Circular 5110B, *Tri-State Oil Tool Industries, Inc./Lockomatic Expanding Hole Openers*, Jan. 1985, four pages.

Brochure Cover Sheet, *Kennametal Milling*, 1987, Cover plus pp. 75 & 76.

Brochure Cover Sheet, *Sandvik Coromant Production Tool Sales*, undated; Cover and single page.

Brochure, *Tri-State Oil Tool Industries, Inc.*, 1990; pp. 2, 35, 41.

Brochure, *Servo/Downhole Milling*, date unknown; pp. 22-27.

General Catalog, *Tri-State Oil Tool Industries, Inc.-/Multi-String Cutter*, 1990, p. 4.

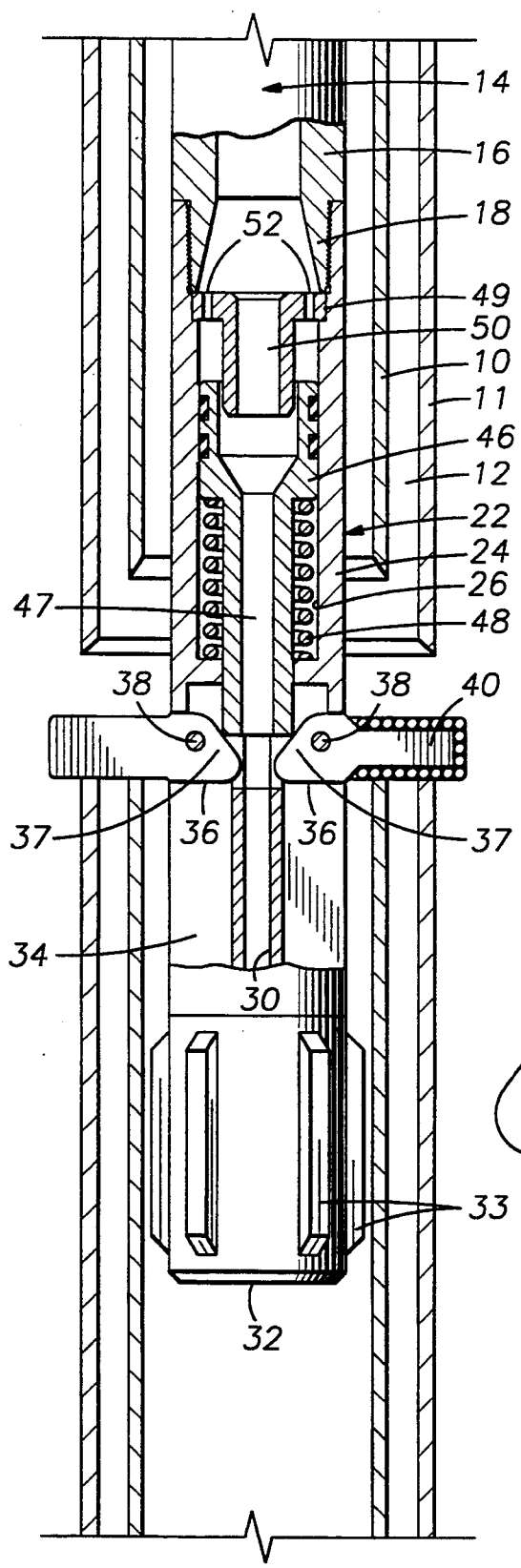
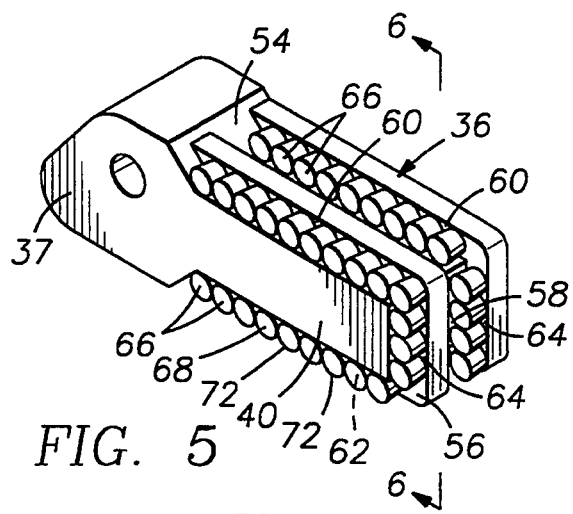
FIG. 5
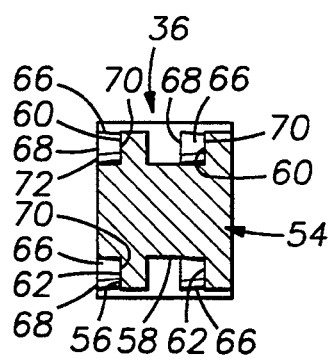
FIG. 6
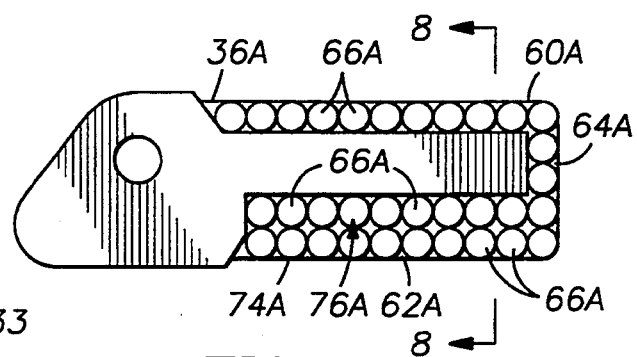
FIG. 7
FIG. 4
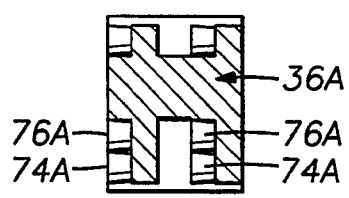
FIG. 8

DOWNHOLE MILLING TOOL

RELATED APPLICATIONS

This application is a continuation-in-part of copending application Ser. No. 948,362, filed Sep. 21, 1992, now U.S. Pat. No. 5,297,630 entitled "Downhole Milling Tool", which is a continuation of application Ser. No. 680,702, filed Apr. 4, 1991, now U.S. Pat. No. 5,150,755 dated Sep. 29, 1992, which is a continuation-in-part of application Ser. No. 621,063, filed Dec. 3, 1990, now U.S. Pat. No. 5,058,666 dated Oct. 22, 1991, which is a continuation of application Ser. No. 181,812, filed Apr. 15, 1988, now U.S. Pat. No. 4,978,260 dated Dec. 18, 1990, which is a continuation-in-part of application Ser. No. 816,287, filed Jan. 6, 1986, now U.S. Pat. No. 4,796,709 dated Jan. 10, 1989.

FIELD OF THE INVENTION

This invention relates generally to a cutting or milling tool and method for cutting or milling fixed casing strings downhole, and more particularly to such a cutting tool and method having cutting blades extending radially outwardly from the cutting tool for cutting the casing strings.

BACKGROUND OF THE INVENTION

Heretofore, such as shown in U.S. Pat. No. 4,8887,668 dated Dec. 19, 1989, cutting tools for cutting well casing or casing strings have been provided utilizing swinging blades for first cutting the inner periphery of a string of well casing and then cutting a section of the cut casing string from its annular cut end for removing a desired length or longitudinal section of casing as might be required for removing a damaged section or to provide a window for diagonal drilling, for example, As shown in the aforementioned patent, swinging blades have had separate cutting inserts or discs mounted on their outer ends and upper sides for cutting a single string of casing.

Normally, and especially for wells of a substantial depth, casing strings of different diameters are utilized with the lowermost casing string being of the widest diameter. For example an outer lower casing of around 13-⅜ inches in diameter with an inner upper casing of around 9-⅝ inches in diameter may be utilized with overlapping end portions providing an annulus filled with concrete for securing the two casing strings together in a sealed relation. Thus, in the event the removed casing sections include a so-called cemented joint, it is necessary to remove two separate casing strings at the joint as well as concrete in the annulus between the strings.

In the event the inner casing is removed first in one cutting operation, and then the outer casing is removed in a separate cutting operation, a different blade or tool is utilized which requires a tripping or removal of the tool from the bore hole. If the same cutting tool is used for both cutting operations, it is difficult to stabilize the cutting tool during cutting of the outer string, as the tool body which fits within the inner casing is spaced laterally a substantial distance from the inner periphery of the outer casing. While special blades, utilizing a tang or projecting lug on the lower end of each blade for riding along the inner periphery of the outer casing, may be used for stabilization of the tool during the cutting operation, such an arrangement requires removal of the cutting tool from the bore hole after cutting of the inner casing for attachment of the special blades and subsequent running in of the tool. Such a "tripping" of the cutting tool is costly and time consuming.

U.S. Pat. No. 3,331,439 shows a cutting tool for cutting multiple casing strings simultaneously without having to remove the cutting tool from the well bore and with the cutting tool centered by the small diameter casing being cut. However, this cutting tool removes a section or length of casing by engaging and cutting the lower annular cut end of the casing and the cutting surface of the blade is along its upper side only.

For cutting multiple casing strings simultaneously, the cutting blades must first cut through the walls of the multiple casing strings in series, and then a section or length of the multiple casing strings is cut away simultaneously. Thus, as shown in U.S. Pat. No. 3,331,439, the cutting surface on the extending end of the pivoted blade has been utilized for cutting through the casing walls in series and then the cutting surface along the upper side of the blade has been utilized for cutting away the lower annular cut ends of multiple casing strings simultaneously during upward movement of the cutting tool.

SUMMARY OF THE INVENTION

The present invention is directed to a tool for cutting or milling fixed casing strings downhole, and, in one embodiment, to such a cutting tool for cutting multiple casing strings simultaneously with the same blades and without any trips in and out of the well being required for changing to different type blades or tools. The cutting tool has a plurality of radially extending blades, with each blade having at least one cutting element on its leading face when the tool is rotated about its axis in a cutting action. In one embodiment, the blades swing out to a radially extended position. Upon rotation of the cutting tool and initiation of the cutting action, the cutting element surface adjacent to the corner of each blade between the outer end and upper side thereof first engages the inner periphery of the inner casing for cutting through the wall of the inner casing. After cutting through the wall of the inner casing, the blades can expand further outwardly and the surface of the cutting element near the lower side of the blade then engages the upper annular cut end of the inner casing in cutting relation for removal of the inner casing. At the same time, the cutting element surface adjacent the corners of the blades at the ends and top sides of the blades simultaneously engages the inner periphery of the outer casing for cutting through the wall of the outer casing. Upon cutting through the wall of the outer casing, the elongate blades further expand radially to a generally horizontal position with the cutting element surface near the lower side of the blade then engaging simultaneously in cutting relation the upper annular ends of both the inner casing and the outer casing for red, oval of a predetermined length thereof. The cutting tool is centralized or stabilized within the inner casing by stabilizer fins extending laterally outwardly from the tool body to a position adjacent the inner periphery of the inner casing for maintaining the cutting tool in a centered position during the cutting operation.

It is an object of the invention to provide a cutting tool having swinging blades for first cutting through the walls of inner and outer casings, and then removing a predetermined length of the casings in a cutting action resulting from downward movement of the tool in the bore hole and without any removal of the cutting tool from the bore hole being required.

It is another object of this invention to provide a cutting tool having outwardly swinging blades with a single cutting element covering the leading face of each blade to permit a simultaneous cutting action against multiple casings by the cutting element on each blade.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

FIG. 4 is a longitudinal sectional view similar to FIGS. 2 and 3 but showing the blades in full expanded position engaging the upper annular cut ends of both inner and outer casings in cutting relation for removal of a predetermined length or section of the casings;

FIG. 5 is a perspective of the blade removed from the cutting tool shown in FIGS. 2-4 and showing a plurality of individual cutting elements along the periphery of the blade;

FIG. 6 is a section taken generally along line 6—6 of FIG. 5;

FIG. 7 is a front elevation of another embodiment a blade in which two rows of cutting elements are provided on the lower side of the blade;

FIG. 8 is a section taken along line 8—8 of FIG. 7;

DESCRIPTION OF PREFERRED EMBODIMENTS

Figure 1A:
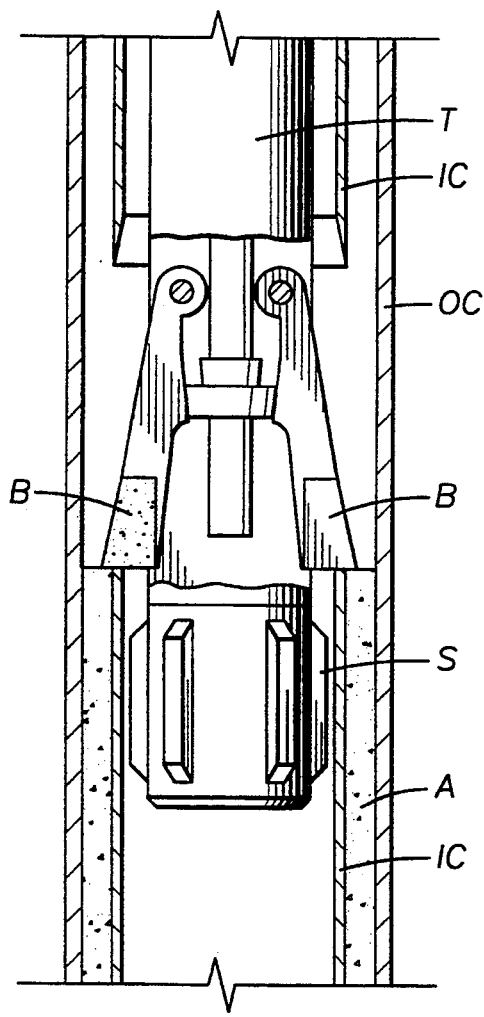
FIGS. 1A and 1B are examples of prior art cutting tools for cutting a well joint having inner and outer concentric casings in which a separate cutting operation is provided for each casing string upon a downward movement of the cutting tool.
Figure 1B:
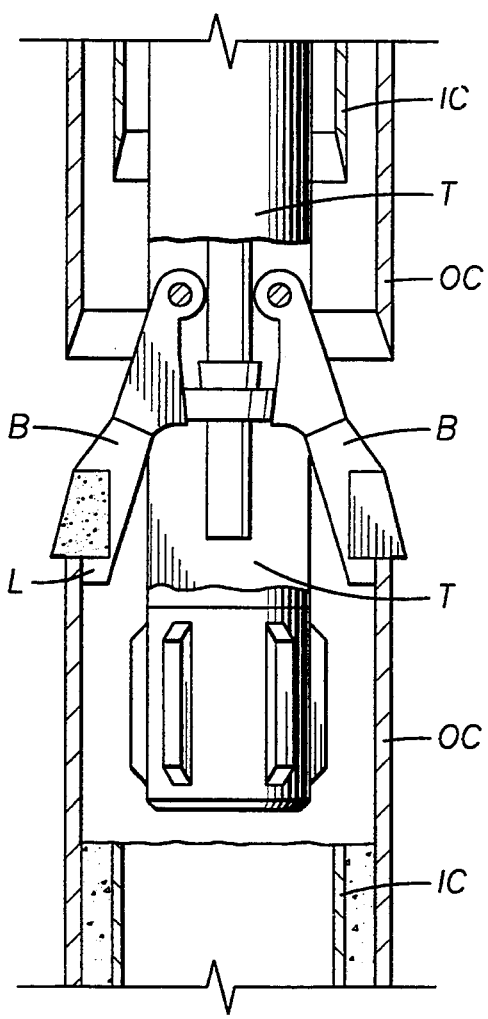

Referring first to FIGS. 1A and 1B, examples prior art cutting tools for cutting concentric casing strings upon downward movement are illustrated. FIG. 1A shows cutting tool T with blades B cutting an inner casing IC and a stabilizer S for centering tool T within inner casing IC during the cutting operation. An annulus A between inner casing IC and outer casing OC is normally filled with concrete. FIG. 1B shows blades B in cutting relation with outer casing OC in a separate cutting operation after removal of a section of inner casing IC. A tang or lug L on blades B is provided to ride along outer casing OC to center or stabilize tool T within outer casing OC.

Figure 2:
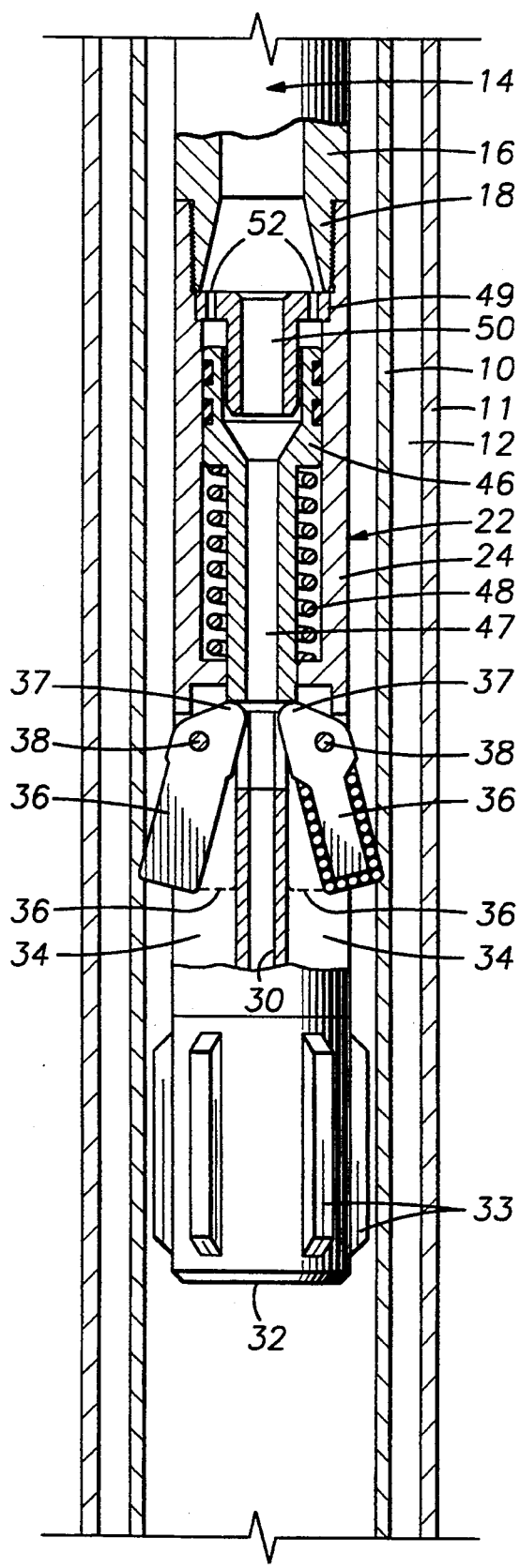
FIG. 2 is a longitudinal sectional view, partly in elevation, showing a cutting tool positioned within an inner casing surrounded by an outer concentric casing with the cutting blades engaging the inner periphery of the inner casing.
Figure 3:
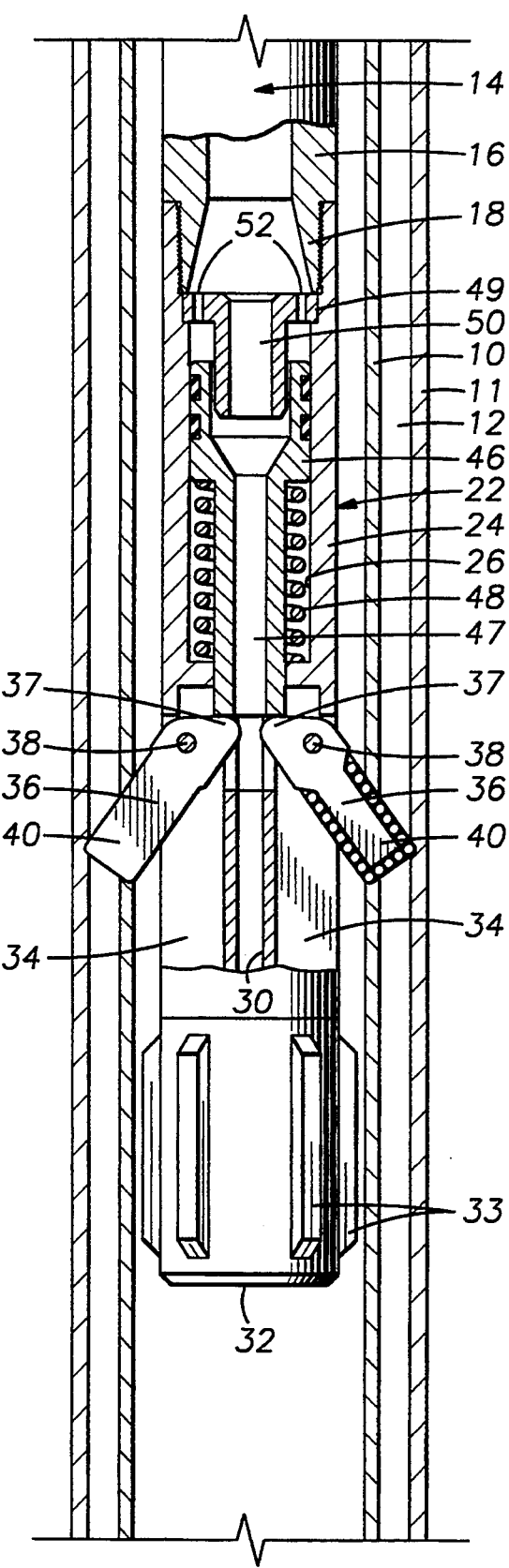
FIG. 3 is a longitudinal sectional view similar to FIG. 2 but showing the ends of the blades engaging the inner periphery of the outer casing with the lower sides of the blades simultaneously engaging the inner casing in a cutting action.

Referring now to the drawings for a better understanding of this invention, and more particularly to FIGS. 2-4, an inner casing or casing string for a well is shown at 10 and an outer concentric casing or casing string is shown at 11. The annulus 12 between casings 10, 11 is usually filled with concrete (not shown). A drill string is indicated generally at 14 having a central bore 16 to receive drilling fluid through drill string 14 from a surface location. A lower threaded end 18 of drill string 14 is received in threaded engagement within the upper end of a cutting tool generally indicated at 22.

Cutting tool 22 has a tubular cutter body 24 forming a central bore 26 which houses a fluid pressure responsive means which will be described later. The fluid pressure responsive means is responsive to flowing drilling fluid from drill string 14 for hydraulic actuation as will De explained further. Cutting tool 22 has a lower reduced diameter bore portion 30 with a lower end 32 for the discharge of drilling fluid. Stabilizer fins 33 extending from body 24 engage the inner periphery of inner casing string 10 for centering tool 22. Longitudinally extending slots 34 are circumferentially spaced about the periphery of tubular cutter body 24 adjacent reduced diameter bore portion 30 and receive elongate cutter blades 36 of a generally rectangular configuration. Each elongate cutter blade 36 has an upper end portion 37 pivotally mounted by a pin 38 to cutter body 24 and a lower downward extending end portion 40. Blades 36 are free for pivoting between a retracted position shown in broken lines in FIG. 2 for lowering within casing 10 and a radially expanded or extended position as shown in FIGS. 3 and 4 in which lower end portions 40 of blades 36 are swung or moved radially outwardly first into cutting contact with the inner periphery of inner casing 10 as shown in FIG. 2 for cutting through the wall of inner casing 10, and then further extended or expanded radially into cutting contact with the inner periphery of outer casing 11 as shown in FIG. 3 for cutting through the wall of outer casing 11. Cutting tool 22 is particularly adapted for cutting through both inner casing 10 and outer casing 11 and then removing a predetermined length of casings 10, 11 in a simultaneous downward cutting action. The cutting operation is normally accomplished in a single trip within the well by directing drilling fluid under pressure from the surface through drill string 14 and by rotating drill string 14 and cutting tool 22 with blades 36 pivoted into a radially expanded position into cutting contact with the periphery of the casing to be cut. The pivotal connections 38 between blades 36 and cutter body 24 are designed so that the connections are sufficient to transmit the torque required to accomplish the cutting of casing strings 10, 11.

For moving lower end portions 40 of cutter blades 36 radially outwardly into expanded cutting engagement with the adjacent casing, the aforementioned fluid pressure responsive means includes a piston 46 having a reduced diameter bore 47 and mounted within cutter body 24. Spring 48 urges piston 46 upwardly. A flow restriction 49 has a reduced diameter bore 50 and a plurality of spaced ports or orifices 52. When a predetermined fluid pressure differential is reached, piston 46 moves downwardly contacting end portions 37 to pivot cutter arms 36 radially outwardly into cutting engagement with casings 10 and 11. When cutter arms 36 are pivoted outwardly into contact with casing 10 or 11, a decreased fluid pressure differential is indicated at the surface so that an operator is aware that cutter arms 36 are in expanded cutting engagement with the inner periphery of the casing to be cut.

Each blade as shown particularly in FIGS. 5 and 6 has a main body portion 54 with cutaway sections defining a leading recessed portion 56 and a trailing recessed portion 58 with respect to the direction of rotation. Each recessed portion 56, 58 extends continuously along three sides of blade 36 to define relative to the fully expanded cutting position of blade 36 an upper side 60, a lower side 62, and an outer extending side or end 64 extending between and connecting upper and lower sides 60, 62.

Sides 60, 62 and connecting end 64 form a planar mounting surface for a plurality of cutting elements or inserts indicated at 66. A single row of cutting elements 66 is mounted on sides 60, 62 and a single row or column of cutting elements 66 is mounted on extending end 64. Cutting elements 66 are preferably formed of tungsten carbide and have leading cutting faces 68 and opposed parallel rear faces 70. Rear planar faces 70 may be secured by suitable brazing or the like to the planar mounting surfaces defining sides 60, 62, and 64. The outer periphery of cutting face 68 defines a cutting edge 72. A cutting element 66 which has been found to function in a satisfactory manner is a generally cylindrical tungsten carbide disc having a thickness of three-sixteenths (3/16) inch, a diameter of three-eights ($\frac{3}{8}$) inch, and sold under the name "Sandvik S6" by the Sandvik Company, located in Houston, Tex.

The embodiment shown in FIGS. 1-6 includes only a single row of cutting elements 66 on the leading and trailing lower sides 62 of blade 36. Since the lower sides 62 of blade 36 are utilized exclusively during the cutting operation for removing a section of casing after the wall of the casing has been cut, the cutting elements on the lower side of the bade are subject to more wear and a longer cutting operation. For that reason it may be desirable to provide more than one row of cutting elements on the lower side of the blade.

The blade embodiment shown in FIGS. 7 and 8 has two rows of cutting elements shown generally at 74A and 76A on blade 36A. Cutting elements 66A are mounted on three sides 60A, 62A, and 64A of blade 36A as in the embodiment of FIGS. 1-6. Cutting elements 66A in lower rows 14A and 76A of blade 36A are axially aligned and follow the same cutting path in the fully extended cutting position of FIG. 4.

Figure 9:
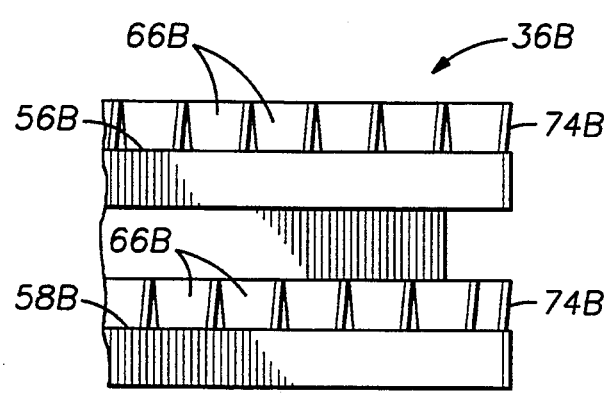
FIG. 9 is a bottom plan of an extending end portion of a modified blade in which the cutting elements on the leading and trailing rows are staggered horizontally to provide different concentric cutting paths.

It may be desirable for the cutting elements in the lower leading and trailing rows to be staggered horizontally when in the cutting position of FIG. 4 so that different concentric cutting paths along the upper annular ends of the casing strings are provided by the corresponding trailing and leading rows. For that purpose, a further blade embodiment is shown in FIG. 9 in a partial bottom plan view of blade 36B. Blade 36B has a lower leading row 74B of cutting elements 66B in recessed portion 56B and a lower trailing row 74B of cutting elements 66B in recessed portion 58B. Cutting elements 66B in trailing row 74B are staggered horizontally with respect to cutting elements 66B in leading row 74B in the full extended cutting position and thus follow different concentric cutting paths. In some instances, it may be desirable to stagger the cutting elements on adjacent blades so that different concentric cutting paths are provided by the corresponding cutting elements on adjacent blades.

Figure 10:
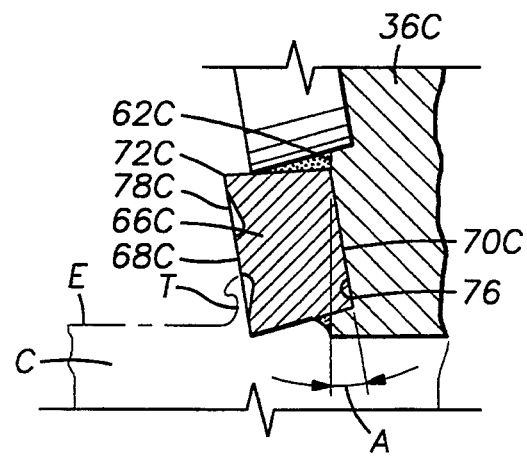
FIG. 10 is a partial sectional view of a further modified blade in which the cutting elements have negative axial rake and the front face of a cutting element is shown engaging the upper annular end of a casing in cutting relation.

The cutting elements 66 shown in the embodiment of FIGS. 1-6 have leading cutting faces 68 forming a planar cutting surface extending in a generally vertical plane parallel to the longitudinal axis of rotation. It may be desirable under certain conditions to have the front face and peripheral cutting edge of each cutting element arranged and constructed in such a manner as to effect a "chip breaker" action to provide a metal turning or shaving from the upper annular end of the casing in a predetermined size range in order to minimize any internesting of metal turnings cut form the casing. For that purpose, a modified blade 36C is shown partially in the embodiment of FIG. 10 having a leading mounting surface or side at 62C. For the purpose of illustration, only one cutting element 66C is illustrated as it is understood that the remaining cutting elements are similar to cutting element 66C. A recess 76 is provided in leading surface or face 62C of blade 36C to form a mounting surface for rear face 70C of cutting elements 66C inclined at a negative rake angle A of around fifteen degrees for example. Since cutting face 68C is parallel to rear mounting face 70C, cutting face 68C is likewise provided with the negative rake angle of around fifteen degrees. A negative rake angle of between around two degrees and twenty-five degrees would provide a so-called "chip breaker" effect. The upper annular end E of a casing C is shown in FIG. 10 and a metal turning T as shown being cut from end E by cutting element 66C. Front face 68C has an annular groove or deformation 78C therein adjacent cutting edge 72C and receives metal turning T for bending turning T in an outward and downward direction to effect a breaking of turning T. Thus, the length turning T is minimized by the negative axial rake angle A and deformation 78C in the front cutting face 68C cutting element 66C.

When the cutting operation is commenced with an unused or new carbide disc, sharp edge 72C initially contacts the inner periphery of the casing to be cut. It is desirable to obtain a relatively short metal turning T which does not tend to intertwine with other metal turnings or shavings and provide an internesting mass which might restrict the removal of such metal scrap. The inclination of cutting face 68C in contact with the metal turnings T, particularly if formed with a deformation 78C therein, assists in the breaking of metal turnings T at a relatively short length of between one to four inches, for example, and since a substantial thickness of turnings T is provided, the curling or turning up of the ends of the turnings T is restricted.

Figure 11:
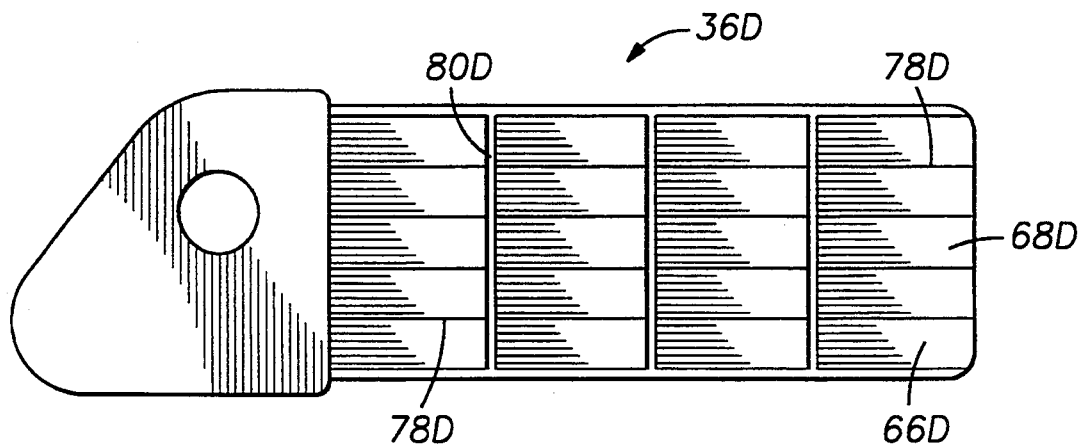
FIG. 11 is an elevation view of one embodiment of the blade of the present invention, with linear surface irregularities for chip breakers.

FIG. 11 shows another alternative embodiment of a blade 36D, in accordance with the present invention, shown as it would extend horizontally in a cutting position. Cutting element 66D, which covers the entire cutting face of blade 36D, has a leading surface 68D which comes into contact with the casing to be cut, as the tool is rotated. Leading surface 68D has surface irregularities in the form of straight linear surface ridges 78D, arranged horizontally. The function of breaking the chips at a short length, performed by ridges 78D, could also be performed by linear surface depressions, rather than ridges, and the linear surface irregularities could be arranged vertically or at some other angle, rather than horizontally, depending upon the desired application. As explained earlier, the chip breaking feature prevents the formation of long chips or turnings, which would be difficult to remove from the well.

Also shown formed on leading surface 68D are grooves 80D which are stress relievers, functioning to prevent the propagation of a crack completely across the cutting element 36D. As previously explained, cutting element 36D is preferably made from a very hard material, such as tungsten carbide, which is likely to be very brittle. When such a material is used to make relatively large cutting elements such as 36D, downhole stresses can cause the formation of a crack in the cutting element 36D. Grooves 80D will prevent any such cracks from propagating across the element and causing a major portion of cutting element 36D to break loose. Grooves 80D are shown as linear grooves vertically arranged, but they could take other shapes and orientations.

Figure 12:
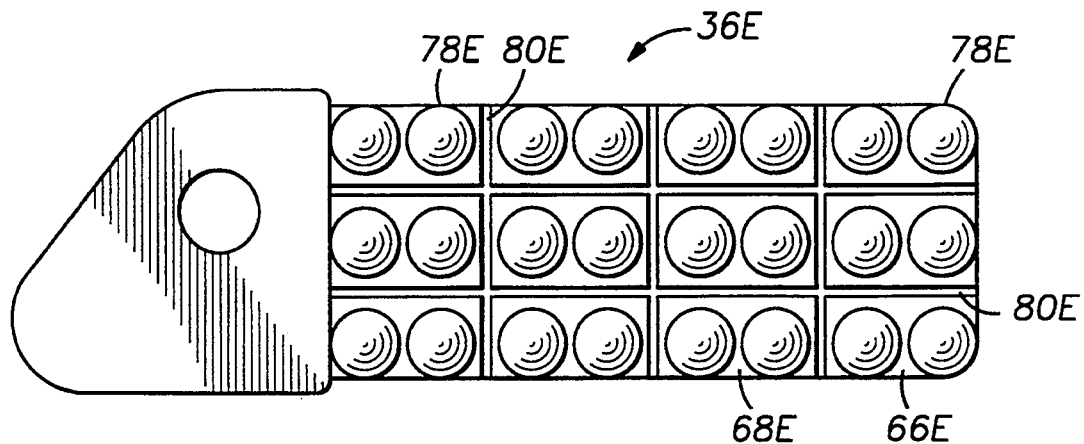
FIG. 12 is an elevation view of an alternative embodiment of the blade of the present invention, with circular surface irregularities for chip breakers.

FIG. 12 shows still another alternative embodiment of a blade 36E, in accordance with the present invention. Cutting element 66E, which covers the entire cutting face of blade 36E, has a leading surface 68E which comes into contact with the casing to be cut, as the tool is rotated. Leading surface 68E has surface irregularities in the form of circular surface ridges 78E, arranged in horizontal rows and vertical columns. The function of breaking the chips at a short length, performed by ridges 78E, could also be performed by circular surface depressions, rather than ridges, and the surface irregularities could be arranged in some other pattern, rather than in rows and columns, depending upon the desired application.

Also shown formed on leading surface 68E are grooves 80E which are stress relievers, as previously explained. Grooves 80E are shown as linear grooves in a vertical and horizontal crossing pattern, but they could take other shapes and orientations.

Figure 13:
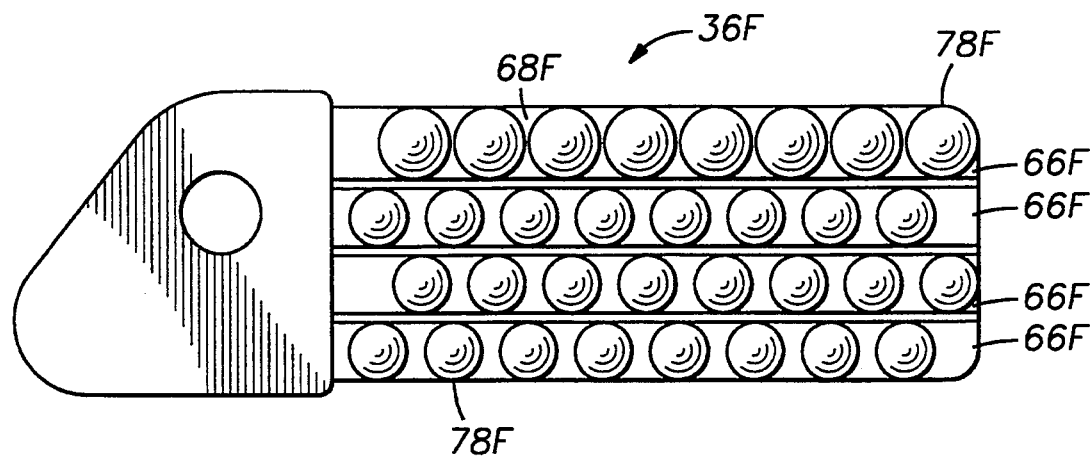
FIG. 13 is an elevation view of another alternative embodiment of the blade of the present inventions with a plurality of cutting elements arranged in a column, each having circular surface irregularities for chip breathers.

FIG. 13 shows yet another alternative embodiment of a blade 36F, in accordance with the present invention. A plurality of cutting elements 66F, each of which extends the full horizontal width of the cutting face of blade 36F, are arranged in a vertical column on the leading face of blade 36F. Each cutting element 66F has a leading surface 68F which comes into contact with the casing to be cut, as the tool is rotated. Leading surface 68F has surface irregularities in the form of circular surface ridges 78F, arranged in horizontal rows. The function of breaking the chips at a short length, performed by ridges 78F, could also be performed by circular surface depressions, rather than ridges, and the surface irregularities could be arranged in some other pattern, rather than in horizontal rows, depending upon the desired application. As an example, the surface irregularity on each cutting element 66F could be a single horizontal linear ridge or depression, or there could be a vertical column of horizontal linear ridges or depressions on each element 66F.

As discussed above, depending upon the size of cutting element 66F, leading surface 68F could have grooves for stress relievers.

While inner and outer casings 10 and 11 are shown in the drawings as being in an exact concentric relation, it is to be understood that the present invention will function in a satisfactory manner with the inner and outer casings in an eccentric relation. Similarly, the embodiments of the invention shown in FIGS. 11 through 13 are shown as blades for a section milling tool, constructed to pivot outwardly into a cutting position, but the invention embodied in these blades could just as easily be practiced in stationary blades for a pilot mill or some other type of downhole milling tool.

While the particular Downhole Milling Tool as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. In a cutting tool adapted to be positioned downhole in a well for removing material from the well bore:
   a tool body adapted to be received within said well and to be supported at its upper end for rotation about its longitudinal axis;
   a plurality of blades at spaced intervals around the tool body;
   each of said blades comprising a cutting element mounted on a leading surface of said blade;
   with each of said cutting elements having an exposed cutting face presenting a surface irregularity for deflecting a turning, cut from said material, outwardly from said cutting face and back toward said material, causing said turning to break into relatively short lengths.

2. A cutting tool as claimed in claim 1, wherein said surface irregularity comprises a projection on said cutting face of said cutting element.

3. A cutting tool as claimed in claim 1, wherein said surface irregularity comprises a depression in said cutting face of said cutting element.

4. A cutting tool as claimed in claim 1, wherein a single cutting element substantially covers said leading surface of said blade.

5. A cutting tool as claimed in claim 1, further comprising a plurality of said cutting elements arranged in a vertical column on said leading surface of each of said blades.

6. A cutting tool as claimed in claim 1, wherein said surface irregularity is a linear irregularity.

7. A cutting tool as claimed in claim 1, wherein said surface irregularity is a circular irregularity.

8. A cutting tool as claimed in claim 1, further comprising a stress reliever in said cutting element for arresting the propagation of cracks.

9. In a cutting tool adapted to be positioned downhole in a well for removing material from the well bore:
   a tool body adapted to be received within said well and to be supported at its upper end for rotation about its longitudinal axis;
   a plurality of blades at spaced intervals around the tool body;
   each of said blades comprising a single cutting element mounted on and substantially covering a leading surface of said blade;
   with each of said cutting elements having an exposed cutting face presenting a horizontally oriented raised linear ridge for deflecting a turning, cut from said material, outwardly from said cutting face and back toward said material, causing said turning to break into relatively short lengths.

* * * * *